US010867076B2

(12) United States Patent
Stearns et al.

(10) Patent No.: US 10,867,076 B2
(45) Date of Patent: Dec. 15, 2020

(54) EDGE DEVICE DISABLEMENT

(71) Applicant: Hewlett Packard Enterprise Development LP, Houston, TX (US)

(72) Inventors: Michael Stearns, Cypress, TX (US); Mark Barlow Hammer, Houston, TX (US); Chanh V. Hua, Houston, TX (US); Sunil Gopalkrishna, The Woodlands, TX (US); Yang Wang, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 181 days.

(21) Appl. No.: 15/962,243

(22) Filed: Apr. 25, 2018

(65) Prior Publication Data

US 2019/0332812 A1 Oct. 31, 2019

(51) Int. Cl.
*G06F 21/70* (2013.01)
*G06F 21/81* (2013.01)

(52) U.S. Cl.
CPC .............. *G06F 21/70* (2013.01); *G06F 21/81* (2013.01)

(58) Field of Classification Search
CPC ................................. G06F 21/70; G06F 21/81
USPC .......................................................... 726/36
See application file for complete search history.

(56) References Cited

U.S. PATENT DOCUMENTS

| | | | | |
|---|---|---|---|---|
| 5,513,244 A | * | 4/1996 | Joao | B60R 25/018 340/425.5 |
| 5,550,476 A | * | 8/1996 | Lau | G01R 15/142 324/509 |
| 6,032,257 A | | 2/2000 | Olarig et al. | |
| 6,334,150 B1 | * | 12/2001 | Cromer | G06F 21/305 709/223 |
| 6,571,382 B1 | | 5/2003 | Jacobson et al. | |
| 6,591,320 B1 | * | 7/2003 | Cheston | G06F 13/4027 710/104 |
| 8,245,315 B2 | | 8/2012 | Cassett et al. | |
| 8,381,264 B1 | | 2/2013 | Corddry et al. | |
| 8,499,171 B2 | | 6/2013 | Mauro et al. | |
| 8,880,765 B2 | | 11/2014 | Melvin et al. | |
| 9,208,359 B2 | | 12/2015 | Berger et al. | |
| 9,882,901 B2 | | 1/2018 | Alexander et al. | |
| 2002/0025850 A1 | * | 2/2002 | Hafezi | G07F 17/3202 463/29 |
| 2003/0018895 A1 | | 1/2003 | Morrison et al. | |
| 2003/0207605 A1 | * | 11/2003 | Westphall | H05K 7/1409 439/325 |

(Continued)

OTHER PUBLICATIONS

NPL Search Results (Year: 2019).*

(Continued)

*Primary Examiner* — Syed A Zaidi
(74) *Attorney, Agent, or Firm* — Brooks, Cameron & Huebsch, PLLC

(57) ABSTRACT

Examples relate to edge device disablement. In some examples, edge device disablement includes an edge device including a processing resource in communication with a memory resource including instructions executable to receive an indication of a disablement trigger associated with the edge device and responsive to the indication, reprogram a printed circuit assembly (PCA) of the edge device to render mechanisms of the PCA inoperable.

17 Claims, 3 Drawing Sheets

(56) References Cited

U.S. PATENT DOCUMENTS

| | | | |
|---|---|---|---|
| 2004/0143750 A1* | 7/2004 | Kulack | G06F 21/35 726/25 |
| 2004/0193914 A1 | 9/2004 | Chih-Wei et al. | |
| 2007/0046791 A1* | 3/2007 | Wang | G06F 8/63 348/231.6 |
| 2008/0083982 A1 | 4/2008 | Kelley et al. | |
| 2010/0208403 A1* | 8/2010 | Das | G01R 19/2513 361/94 |
| 2012/0013201 A1* | 1/2012 | Pariseau | H02J 7/0029 307/125 |
| 2012/0278601 A1* | 11/2012 | Chang | G06F 1/3203 713/2 |
| 2014/0373166 A1* | 12/2014 | Little | G06F 21/79 726/26 |
| 2015/0040243 A1* | 2/2015 | Mittal | G06F 21/554 726/27 |
| 2015/0304956 A1* | 10/2015 | Mach | H04W 52/0274 455/574 |
| 2016/0344862 A1 | 11/2016 | Tucker | |
| 2019/0018465 A1* | 1/2019 | Whitby-Strevens | G06F 1/3215 |
| 2019/0229895 A1* | 7/2019 | Finkelstein | H04L 63/0428 |

OTHER PUBLICATIONS

NPL Search Results (Year: 2020).*
NPL Search Terms (Year: 2020).*
Protecting the IoT with Secure Hardware, (Web Page), Mar. 7, 2017, 4 Pgs.
International Search Report and Written Opinion received for PCT Application No. PCT/US2019/029225, dated Aug. 23, 2019, 12 pages.

* cited by examiner

EDGE DEVICE DISABLEMENT

BACKGROUND

Edge computing includes performing data processing at an edge of a network, near a source of the data. Analytics and knowledge generation are performed at or near the source of the data. Edge computing pushes applications, data, and computing power away from centralized points to edges of a network.

DETAILED DESCRIPTION

Figure 1:
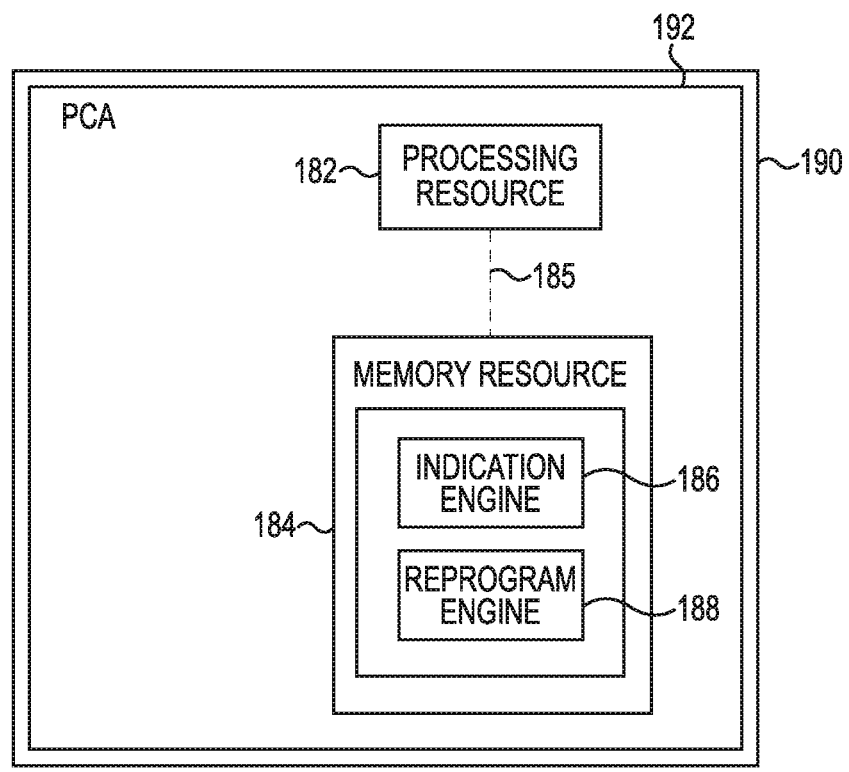
FIG. 1 illustrates a diagram of a system including an edge device including a processing resource, a memory resource, and engines according to an example.

Edge systems including edge devices can be deployed in remote locations under different security measures as compared to datacenters including datacenter devices. For instance, datacenters may have protocols for access and movement of people and datacenter assets that may be challenging for edge systems based on their locations and/or design.

For instance, datacenter devices such as computing devices, may be in a locked building with limited external access and within interiorly locked doors with further restricted access to personnel. The limited scope of the building may make exterior and interior surveillance easier to manage as compared to edge systems For instance, edge systems can include a plurality of edge devices to perform data processing at an edge of a network near the source of the data such that communication bandwidth needed between sensors and a central datacenter can be reduced by performing analytics and knowledge generation at or near the source of the data. Edge devices can include, for instance computing devices within an edge system that process and/or store data locally and push received data to a central data center and/or cloud storage repository. The edge system may have a footprint smaller than a full-sized datacenter, for instance.

Because of deployment locations of edge systems (e.g., public buildings, private buildings, outdoors, etc.), the edge devices of the edge systems can be accessed by unauthorized users without the security protocols and/or surveillance of more protected datacenters. This can jeopardize network security, data security, and hardware security, among others. For instance, an unauthorized user may physically access an edge device and access data and/or hardware.

Some approaches to securing an edge system include place an edge device in a difficult-to-access location (e.g., very high in a room, need equipment to access, etc.), secure an edge device in a locked closet, and/or secure the edge device in a locked box. However, such approaches can limit a scope of deployment of the edge system and/or edge device or may allow for physical intrusion of the hardware of and edge device (e.g., break a lock, access when locking was forgotten, etc.). Other approaches include a secure boot and/or user access controls for edge devices. However, such approaches allow for theft of hardware components of the edge system.

Examples of the present disclosure can allow for securing both hardware and software elements of an edge device within an edge system. For instance, the hardware and the software can be rendered inoperable responsive to a disablement trigger. Once the disablement trigger is detected, the hardware may not be recovered except by a manufacturer of the hardware. In some examples, a printed circuit assembly (PCA) of the edge device can be rendered inoperable such that subsystems (e.g., hardware and/or software components) of the PCA no longer function. In some examples, responsive to the disablement trigger, the hardware and the software can be rendered inoperable in less than a second, reducing opportunities to stop disablement. The PCA can include a printed circuit board populated with electronic components, for example.

FIG. 1 illustrates a diagram of a system including an edge device 190 including a processing resource 182, a memory resource 184, and engines 186, 188 according to an example. In some instances, edge device 190 can be a controller. Edge device 190 can be an edge device within an edge system and can house PCA 192. While one edge device 190 and one PCA 192 are illustrated in FIG. 1, more edge devices and/or PCAs may be present.

The edge device 190 can be a combination of hardware and instructions for edge device disablement. The hardware, for example can include a processing resource 182 and/or a memory resource 184 (e.g., machine-readable medium (MRM), computer-readable medium (CRM), data store, etc.).

The processing resource 182, as used herein, can include a number of processing resources capable of executing instructions stored by a memory resource 184. The instructions (e.g., machine-readable instructions (MRI)) can include instructions stored on the memory resource 184 and executable by the processing resource 182 to implement a desired function (e.g., edge device disablement). The memory resource 184, as used herein, can include a number of memory components capable of storing non-transitory instructions that can be executed by processing resource 182. Memory resource 184 can be integrated in a single device or distributed across multiple devices. Further, memory resource 184 can be fully or partially integrated in the same device as processing resource 182 or it can be separate but accessible to that device and processing resource 182. Thus, it is noted that the edge device 190 can be implemented on an electronic device and/or a collection of electronic devices, among other possibilities.

The memory resource 184 can be in communication with the processing resource 182 via a communication link (e.g., path) 185. The communication link 185 can be local or remote to an electronic device associated with the processing resource 182. The memory resource 184 includes engines (e.g., indication engine 186, reprogram engine 188). The memory resource 184 can include more engines than illustrated to perform the various functions described herein.

The engines 186, 188 can include a combination of hardware and instructions to perform a number of functions described herein (e.g., edge device disablement). The instructions (e.g., software, firmware, etc.) can be downloaded and stored in a memory resource (e.g., MRM) as well as a hard-wired program (e.g., logic), among other possibilities.

The indication engine 186 can receive an indication of a disablement trigger associated with edge device 190. The disablement trigger can include, for instance, a triggered physical sensor and/or a triggered software sensor. For example, a physical sensor can include a tamper sensor and/or a lid sensor indicating the edge device is being physically accessed. A physical sensor can also include a global positioning system (GPS) for movement detection and/or for geofencing. In some examples, a physical sensor can include a shock sensor and/or an accelerometer to indicate a threshold amount of movement has occurred (e.g., the edge device is being taken without approval).

A software sensor, for example, can include a disablement trigger initiated by an administrator or other approved disabler. In some examples, a software sensor can include a sensor that determines an incorrect password has been entered a threshold number of times or an unauthorized remote connection is being attempted, among other software sensors. While the aforementioned physical and software disablement triggers are provided, examples are not so limited, and other disablement triggers can be used for determining when an edge device is disabled.

In some examples, PCA 192 includes an embedded management processor to initiate the indication of the disablement trigger. Because the management processor is embedded in hardware, for instance, an edge device disablement option can be offered to a user at the user's discretion. The option can be used, for instance, in place of a lock box for edge devices or enhancement to physical security of the edge system deployment location.

In response to the indication, reprogram engine 188 can reprogram a PCA 192 of edge device 190 to render mechanisms of PCA 192 inoperable. For instance, mechanisms rendered inoperable can include hardware components and/or software components associated with PCA 192. Rendering hardware components, in addition to software components, inoperable can prevent bad actors from obtaining passwords or software to unlock hardware and access data on the edge device. In some instances, functions of indication engine 186 and reprogram engine 188 can be implemented in hardware without software.

In some examples, to render the hardware components inoperable, subsystems of PCA 192 can be programmed to no longer function. For instance, control logic of PCA 192 can be reprogrammed to disable power rails of PCA 192 and hold associated devices in reset. The power rails, for instance, can be such that power is not able to be forced to operate externally. In some examples, as a part of disablement, programmable portions of PCA 192 may not be reprogrammable, and programming interfaces on PCA 192 can be disabled in order to prevent recovery by a user other than a manufacturer of PCA 192 having unique tools and knowledge to recover PCA 192.

In some examples, disablement of PCA 192 and the edge device can be non-destructive such that upon recovery by the manufacturer, the hardware and software components can be used. This is in contrast to other approaches that use chemical reactions or other destructive disablement approaches. The use of chemicals can be dangerous to users, and over time chemical reactions may become less reactive and less useful for disablement. Additionally, by having a non-destructive disablement, components can be reused, which can be cost-effective.

In some instances, the PCA can be reprogrammed in a time period that falls below a particular threshold, such as one second, half a second, or other time period. For instance, because a disablement can happen within a fraction of a second from the time a disablement trigger is generated, tampering or preventing the disablement can be prevented. For example, removing power (e.g., by a bad actor attempting to prevent disablement of the edge device) after a disablement trigger is activated may be too late to prevent disablement.

Figure 2:
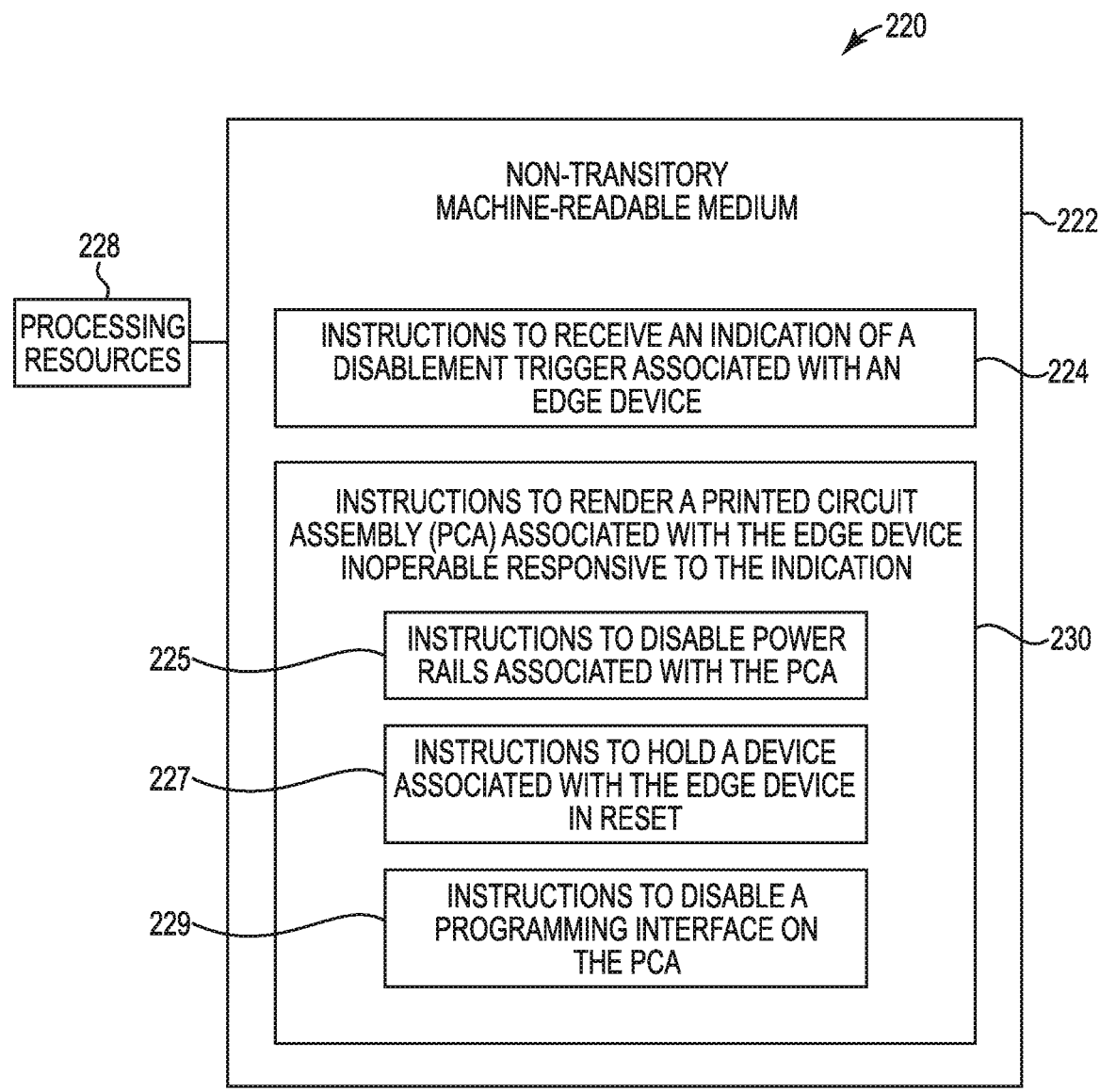
FIG. 2 illustrates a system 220 for edge device disablement according to an example.

FIG. 2 illustrates a system 220 for edge device disablement according to an example. In some examples, system 220 can be a device akin to edge device 190 as illustrated in FIG. 1. For instance, system 220 can be a computing device in some examples and can include a processing resource 228. System 220 can further include a non-transitory MRM 222, on which may be stored instructions, such as instructions 224 and 230. Although the following descriptions refer to a processing resource and a memory resource, the descriptions may also apply to a system with multiple processing resources and multiple memory resources. In such examples, the instructions may be distributed (e.g., stored) across multiple non-transitory MRMs and the instructions may be distributed (e.g., executed by) across multiple processing resources. Processing resource 228 and non-transitory MRM 222 can be akin to the processing resource and memory resource described with respect to FIG. 1.

Non-transitory MRM 222 may be electronic, magnetic, optical, or other physical storage device that stores executable instructions. Thus, non-transitory MRM 222 may be, for example, Random Access Memory (RAM), an Electrically-Erasable Programmable Read-Only Memory (EEPROM), a storage drive, an optical disc, and the like on-transitory MRM 222 may be disposed within system 220, as shown in FIG. 2. In this example, the executable instructions 224, 230 may be "installed" on the device. Additionally and/or alternatively, non-transitory MRM 222 can be a portable, external or remote storage medium, for example, that allows system 220 to download the instructions 224, 230 from the portable/external/remote storage medium. In this situation, the executable instructions may be part of an "installation package". As described herein, non-transitory MRM 222 can be encoded with executable instructions for edge device disablement.

Instructions 224, when executed by a processing resource such as processing resource 228, can include instructions to receive an indication of a disablement trigger associated with an edge device. For instance, a disablement trigger can include a physical disablement trigger (e.g., sensor) and/or a software disablement trigger (e.g., sensor). In some examples, the disablement trigger can be selectively turned on or off (e.g., by an administrator locally or remotely) and/or it can include be based on a location of the edge device, movement of the edge device, new application installation on the edge device, or a new device connected to the edge device (e.g., universal serial bus (USB)), among others. The disablement trigger can indicate an unauthorized access attempt of software and/or hardware components of the edge device. Put another way, the disablement trigger can indicate the edge device and/or edge system is no longer trusted.

Instructions 230, when executed by a processing resource such as processing resource 228, can include instructions to render a PCA associated with the edge device inoperable responsive to the indication. For instance, hardware and/or software associated with the PCA can be rendered inoperable. By disabling hardware and software, in some examples, unauthorized access can be prevented. For instance, even if an unauthorized user steals hardware, data cannot be obtained from the hardware, as it has been rendered inoperable responsive to the disablement trigger indication.

In some examples, the rendering can comprise instructions 225 that when executed by a processing resource such as processing resource 228 can disable power rails associated with the PCA. The rendering can further comprise instructions 227 that when executed by a processing resource such as processing resource 228 can hold a device associated with the edge device in reset. For instance, a management processor embedded in the edge device (e.g., in the PCA) and/or a compute resource associated with the edge device can be held in reset. With the power rails inoperable and the management processor and compute resource held in reset, the components are not usable, and the edge device cannot be powered up, until a manufacturer with unique tools and knowledge of the hardware of the edge device can recover the edge device. For instance, the edge device can include hardware having signals that are accessible using particular hardware and/or equipment to recover.

In some examples, the rendering can comprise instructions 229 that when executed by a processing resource such as processing resource 228 can disable a programming interface on the PCA. For instance, by disabling the programming interface, the PCA cannot reprogram itself, rendering the PCA inoperable until recovered by a manufacturer.

In some instances, the PCA can be rendered inoperable in a threshold amount of time. For instance, the PCA can be rendered inoperable in less than one second. This can prevent unauthorized users from attempting to prevent disablement by removing power from the edge device. The disablement happens too quickly, and the edge device cannot be recovered by pressing a power button or using flash firmware to recover because both hardware and software components are disabled.

Figure 3:
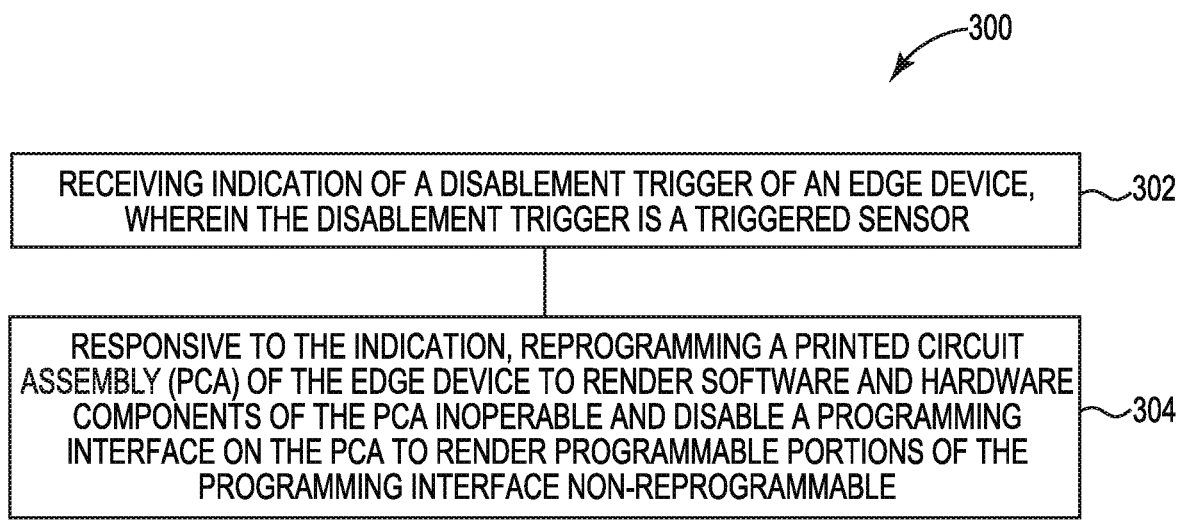
FIG. 3 illustrates a diagram of a method for edge device disablement according to an example.

FIG. 3 illustrates a diagram of a method 300 for edge device disablement according to an example. At 302, method 300 includes receiving indication of a disablement trigger of an edge device. The disablement trigger, for example, can be a triggered sensor such as a location sensor or a tamper sensor, among others. In some examples, the indication can be received from a management processor embedded on the edge device. For instance, the embedded management processor can run custom code that receives an indication that disablement is to be triggered and/or sensors can be read that determine an event has occurred that triggers disablement of the edge system. The indication, in some instance, can be received via remote user input. For instance, a user in a remote location can access the embedded management processor and instruct the embedded management processor to trigger a disablement of the edge device.

At 304, method 300 includes reprogramming a PCA of the edge device responsive to the indication. The reprogramming, for instance, can include rendering software and hardware components of the PCA inoperable and disabling a programming interface on the PCA to render programmable portions of the programming interface non-reprogrammable. In some examples, the PCA can be reprogrammed such that the hardware and the software components of the PCA are recoverable only by a manufacturer of the edge device. For instance, the manufacturer may have unique equipment and knowledge for recovery of the edge device. Because the manufacturer can recover the PCA and the edge device, method 300 is non-destructive. This can reduce liability and injury, for instance, as compared to disablement approaches that use chemicals. In addition, the non-destructive nature can allow for re-use of the hardware and software components, which can be cost-effective.

In the foregoing detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

What is claimed is:

1. An edge device comprising a processing resource in communication with a memory resource including instructions executable to:
   receive an indication of a disablement trigger associated with the edge device; and
   responsive to the indication, reprogram a printed circuit assembly (PCA) of the edge device to render mechanisms of the PCA inoperable within one second.

2. The edge device of claim 1, wherein the mechanisms comprise hardware components and software components.

3. The edge device of claim 1, further comprising a management processor embedded in the edge device to initiate the indication of the disablement trigger.

4. The edge device of claim 1, wherein the disablement trigger comprises a triggered physical sensor.

5. The edge device of claim 1, wherein the disablement trigger comprises a triggered software sensor.

6. A non-transitory machine-readable medium storing instructions executable by a processing resource to cause a computing system to:
   receive an indication of a disablement trigger associated with an edge device; and
   responsive to the indication, render a printed circuit assembly (PCA) associated with the edge device inoperable in one second or less, the rendering comprising instructions executable to:
   disable power rails associated with the PCA;
   hold a device associated with the edge device in reset; and
   disable a programming interface on the PCA.

7. The medium of claim 6, wherein the instructions executable to render the PCA inoperable comprise instructions executable to render hardware associated with the PCA inoperable.

8. The medium of claim 6, wherein the instructions executable to render the PCA inoperable comprise instructions executable to render software associated with the PCA inoperable.

9. The medium of claim 6, wherein the instructions executable to hold the device associated with the edge device in reset comprise instructions executable to hold a management processor embedded in the edge device in reset.

10. The medium of claim 6, wherein the instructions executable to hold the device associated with the edge device in reset comprise instructions executable to hold a compute resource associated with the edge device in reset.

11. A method, comprising:
receiving indication of a disablement trigger of an edge device at a first time, wherein the disablement trigger is a triggered sensor;
responsive to the indication, reprogramming a printed circuit assembly (PCA) of the edge device at a second time;
wherein the reprogramming is to:
render software and hardware components of the PCA inoperable; and
disable a programming interface on the PCA to render programmable portions of the programming interface non-reprogrammable; and
wherein a time elapsed between a first time and a second time is at most one second.

12. The method of claim 11, wherein receiving indication of the disablement trigger comprises receiving indication of a triggered location sensor.

13. The method of claim 11, wherein receiving indication of the disablement trigger comprises receiving indication of a triggered tamper sensor.

14. The method of claim 11, further comprising receiving indication of the disablement trigger from a management processor embedded on the edge device.

15. The method of claim 11, wherein the method is non-destructive to the edge device and the PCA.

16. The method of claim 11, wherein receiving indication of the disablement trigger comprises receiving indication of the disablement trigger via remote user input.

17. The method of claim 11, further comprising reprogramming the PCA such that the hardware and the software components of the PCA are recoverable only by a manufacturer of the edge device.

* * * * *